United States Patent Office 3,532,878
Patented Oct. 6, 1970

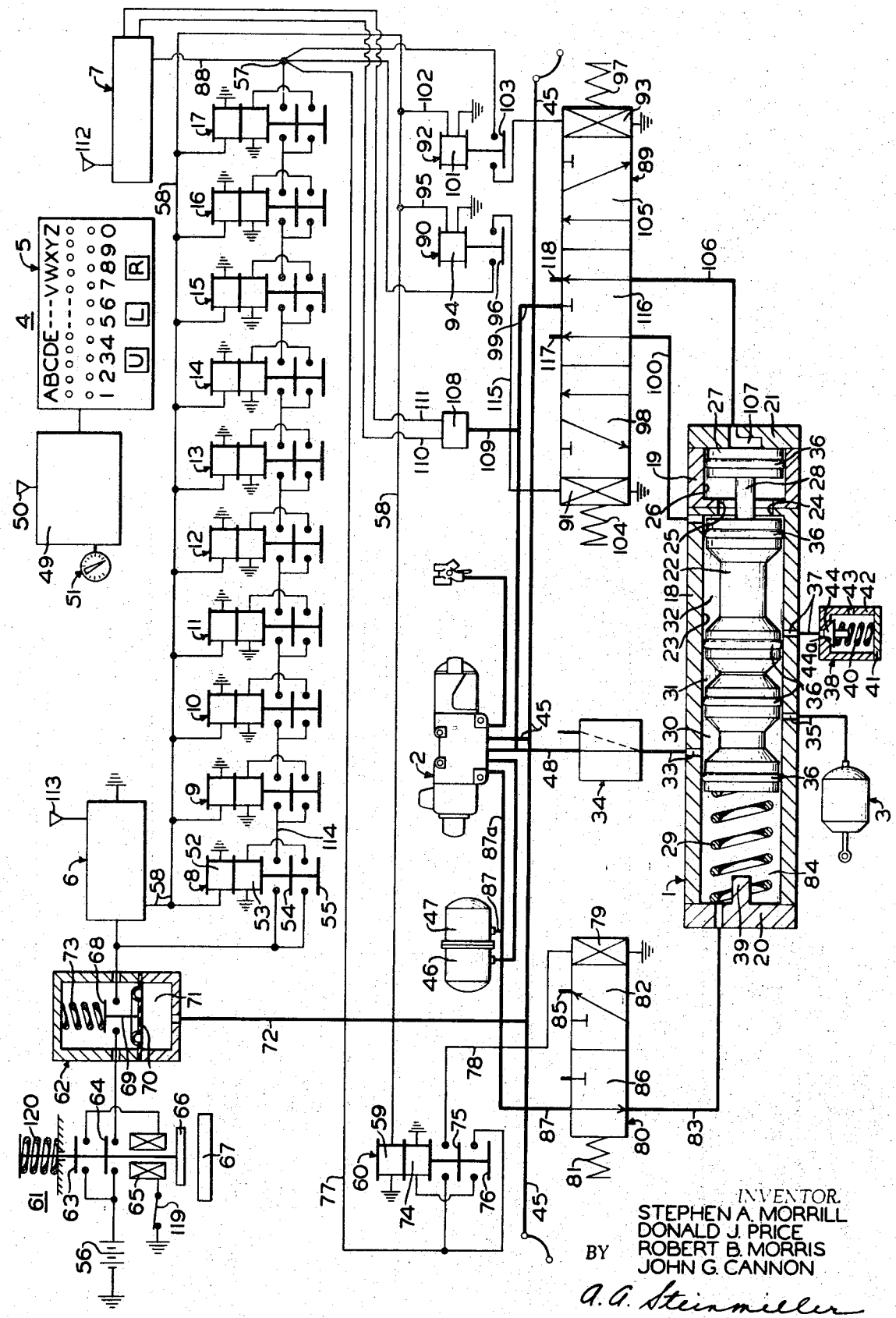

3,532,878
REMOTELY CONTROLLED RAILWAY BRAKE APPARATUS
Stephen A. Morrill, Pittsburgh, Donald J. Price, Monroeville, Robert B. Morris, Irwin, and John G. Cannon, Pittsburgh, Pa., assignors to Westinghouse Air Brake Company, Wilmerding, Pa., a corporation of Pennsylvania
Filed Nov. 12, 1968, Ser. No. 774,704
Int. Cl. B61l 3/12
U.S. Cl. 246—182                                        11 Claims

ABSTRACT OF THE DISCLOSURE

Apparatus for remotely controlling the brakes on railroad cars in railway classification yards to control the speed of free-rolling cars to limit the shock of collision at the time of coupling with other stationary cars. The apparatus includes a fluid pressure release and resupply valve device, interposed between the usual brake control valve device and the brake cylinder on a railway car, remotely controlled selectively by radio signals from a central control location to repeatedly effect the reduction of fluid pressure in the brake cylinder to a selected lower pressure, without concurrent reduction of pressure in the auxiliary and emergency reservoirs, and the subsequent resupply of fluid under pressure from the reservoirs to the brake cylinder until the pressure in the reservoirs is depleted.

BACKGROUND OF THE INVENTION

In present day railway classification yards, it is common practice to employ car retarders associated with the track rails for the purpose of applying a braking force to the flanges of the car wheel as they roll free after having been previously set off from a train and pushed over a hump, so as to limit the speed of the free-rolling cars and to correspondingly limit the shock of collision of the free-rolling car or group of cars with a stationary car or cars to which it is to be coupled. This method of controlling the speed of the free-rolling cars in a classification yard has certain limitations in that the location of the track side car retarder is fixed and therefore ineffective for braking the car until such time as the car reaches the retarder. Moreover, the original cost of the car retarder and the maintenance thereof is a considerable item of expenditure.

It is the general purpose of this invention to minimize, if not eliminate, the need for the costly installation of car retarders in railroad classification yards by utilizing with some degree of modification the existing brake control apparatus on the individual cars for the purpose of controlling the speed of the free-rolling car so as to limit the shock of collision thereof with a stationary car or string of cars to which it is to be coupled. To enable the utilization of the brake control equipment on the cars themselves for the purpose mentioned, auxiliary control equipment providing for remote control of the brakes on the car selectively by radio signals from a central location is contemplated by this invention.

SUMMARY OF THE INVENTION

According to the present invention, the conventional freight car brake equipment of the so-called AB type is modified by the interposition of a fluid pressure release and resupply valve between the conventional brake control valve device and the brake cylinder, which release and resupply valve is remotely controlled by radio signals from a central control tower. In order to insure the selective control of a particular car by the control signals transmitted from the control tower, suitable signaling apparatus is provided for transmitting by radio to radio receivers on each car appropriate signals in accordance with the car identification number, with a feedback radio-transmitted signal to indicate the appropriate receipt of the signal, for purposes of effecting brake control of the corresponding car while rolling free in the classification yard. More specifically, each car is provided with a series of frequency responsive relays corresponding to the car identification number which when serially energized by the signal transmitted from the control tower complete the circuit for insuring the brake control on the specific car and the feedback signal to the control tower.

In the accompanying drawing:

The single figure is a diagrammatic view, partly in section, of a remotely controlled railway car brake apparatus embodying the invention showing a fluid pressure operated release and resupply valve device interposed between a brake control valve device and a brake cylinder for effecting repeated brake releases and reapplications on the car accordingly as certain radio signals are selectively transmitted between a central control location and the car.

As shown in the drawing, the conventional freight car brake equipment of the so-called AB type is modified by the interposition of a fluid pressure operated release and resupply valve device 1 between a conventional brake control valve device 2 and a brake cylinder 3, which release and resupply valve device 1 is remotely controlled by radio signals from a central control tower 4. In order to insure the selective control of a particular car by the control signals transmitted from the control tower 4, suitable signaling apparatus, such as, for example, a manually operated control console 5, is provided at the control tower 4 for transmitting by radio to a radio receiver 6 on the car appropriate signals in accordance with the car identification number, with a feedback radio-transmitted signal from a radio transmitter 7 also located on the car to indicate appropriate receipt of the signal, for the purpose of effecting operation of the release and resupply valve device 1 to control the degree of braking force applied to the wheels of the car and thereby its speed while rolling free along a railway track in a classification yard.

Each railway car is further provided with a plurality of double coil frequency responsive relays 8, 9, 10, 11, 12, 13, 14, 15, 16 and 17. The signal frequency to which each of these relays responds is different and corresponds to a certain specific car identification letter, such as, for example, the letters B and O if the car is owned by the Baltimore and Ohio Railway Company, and a certain specific car identification number, it being understood, of course, that each individual car owned by any given railroad company is identified by a certain specific car number. Accordingly, when the relays 8 to 17 inclusive, are serially energized in a manner hereinafter described in detail by the proper signals transmitted from the control tower 4, a circuit hereinafter described in detail is completed to provide for remote control of brake releases and reapplications on the specific car and the feedback of a signal to the control tower 4 to indicate that the transmitted signal has been received and that the desired brake operation has been effected.

The fluid pressure operated release and resupply valve device 1 shown in the drawing comprises a sectionalized casing that includes a pair of hollow cylindrical casing sections 18 and 19 and a pair of end covers 20 and 21 secured respectively by any suitable means (not shown) to the left-hand end of the casing section 18 and the right-hand end of the casing section 19. The release and resupply valve device 1 further comprises a spool-type valve 22 that is slidably disposed in a horizontal counterbore 23 formed in the casing section 18 coaxial with a bore 24 provided therein. The casing section 19 is provided with a bore 25 and a counterbore 26 respectively coaxial with and of the same diameter as the bore 24 and counterbore 23 in the casing section 18. As shown in the drawing, a piston 27 is slidably mounted in the counterbore 26 and is provided with a piston rod 28 that extends from the left-hand face of the piston 27 through the coaxial bores 24 and 25 into the right-hand end of the counterbore 23.

The spool-type valve 22 is normally biased into contact with the end of the piston rod 28 by a spring 29 interposed between the left-hand end of valve 22 and the end cover 20 that closes the left-hand end of the counterbore 23.

The spool-type valve 22 is provided with three spaced-apart peripheral annular grooves 30, 31 and 32, the length of the grove 30 being such that while the valve 22 is maintained in the position shown in the drawing this groove 30 establishes a communication between that end of a first passageway 33, which is connected by a correspondingly numbered pipe to a manually operated brake cylinder pressure release valve device 34, and a second pasageway 35 which is connected by a correspondingly numbered pipe to the brake cylinder 3. On the lands between these elongated peripheral annular grooves, and also adjacent the left-hand end of the elongated groove 30 and the right-hand end of the elongated groove 32, the valve 22 has formed respective peripheral annular grooves in each of which is disposed an O-ring seal 36 that forms a seal with the wall surface of the counterbore 23. Likewise, the piston 27 has formed thereon a peripheral annular groove in which is disposed an O-ring seal 36 that forms a seal with the wall surface of the counterbore 26.

The lengths of the groves 30 and 31 on the valve 22 are such that when this valve is moved by the piston 27 against the yielding resistance of spring 29 in the direction of the left hand, in a manner hereinafter explained, from the position shown in the drawing to a second position in which the left-hand face of the piston 27 abuts the left-hand end of the counterbore 26, communication is closed between the passageway and corresponding pipe 33 and the passageway and corresponding pipe 35. Moreover, the length of the elongated peripheral annular groove 31 is such that in the above-mentioned second position of the valve 22, communication is closed between the passageway and corresponding pipe 35 and one end of a passageway 37 opening at the wall surface of the counterbore 23 the opposite end of which passageway 37 is connected by a correspondingly numbered pipe to a spring loaded check valve device 38 hereinafter described in detail.

The length of the groove 32 on the valve 22 is such that when this valve is moved against the yielding resistance of spring 29 in the direction of the left hand in response to the supply of fluid under pressure to the right-hand end of this valve 22 in a manner hereinafter described to a third position in which the left-hand end of this valve abuts a stop 39 integral with the end cover 20, a communication is established between the passageway and corresponding pipe 35 and the passageway and corresponding pipe 37 whereby fluid under pressure is released from the brake cylinder 3 until the pressure therein is reduced to a certain chosen low presure determined by the strength of a spring 40 interposed between a cover member 41 secured by any suitable means (not shown) to the open end of a cup-shaped casing 42 having an atmospheric port 43 of the check valve device 38 and a check valve 44 that is normally biased against an annular valve seat 44a by the spring 40.

The brake control valve device 2 may be of the type such as that disclosed in U.S. Pat. 2,031,213, issued Feb. 18, 1936, to Clyde C. Farmer, and assigned to the assignee of the present application.

The hereinbefore-mentioned conventional freight car brake equipment of the so-called AB type comprises, in addition to the brake control valve device 2 and the brake cylinder 3, a brake pipe 45 that extends from end to end of the car, an auxiliary reservoir 46, and an emergency reservoir 47. Since this AB type brake equipment is the same as that described in the above-mentioned Farmer patent, it is deemed unnecessary to show and describe this equipment herein in detail. It will, of course, be understood that the brake control valve device 2 operates upon a service rate or reduction of pressure in the brake pipe 45 to supply fluid under pressure from the auxiliary reservoir 46 to the brake cylinder 3 to effect a service application of the brakes, upon an emergency rate of reduction of pressure in the brake pipe 45 to supply fluid under pressure from both the auxiliary reservoir 46 and the emergency reservoir 47 to the brake cylinder 3 to effect an emergency application of brakes, and upon an increase in brake pipe pressure to effect a release of the brakes, as well as the recharging of the auxiliary reservoir 46 and emergency reservoir 47.

As shown in the drawing, the brake cylinder port of the brake control valve device 2 is connected by a pipe 48 to an inlet chamber (not shown) of the hereinbefore-mentioned manually operated brake cylinder pressure release valve device 34 which may be of the type such as that shown in U.S. Pat. 3,001,833, issued Sept. 20, 1961, to Walter B. Kirk, and assigned to the assignee of the present application. Consequently, it is deemed unnecessary to show and describe this manually operated brake cylinder pressure release valve device herein in detail. It will, of course, be understood that, while the spool valve 22 of the release and resupply valve device 1 occupies the position shown in the drawing, a trainman may manually operate this valve device 34 to effect the release of fluid under pressure from the brake cylinder device 3 to thereby release a previously effected emergency brake application.

Located at the control tower 4 for transmitting appropriate radio signals to the radio receiver 6 on the car and for receiving feedback radio signals from the radio transmitter 7 also on the car is the hereinbefore-mentioned control console 5, or in lieu thereof, a computer system which may be, such as, for example, The Velac Control System manufactured by the Signal & Communications Division of Westinghouse Air Brake Company, a subsidiary of American Standard, Inc., and installed at the Southern Pacific Railway Company's yard in Eugene, Oreg.

The manually operative control console 5 for transmitting control signals from the control tower 4 to the radio receiver 6 on the car comprises thirty-nine push buttons; twenty-six push buttons corresponding to the twenty-six letters of the alphabet, ten push buttons corresponding to the ten numbers of the decimal system of numbers, and three additional push buttons denoted in the drawing by the letters U, L and R respectively remotely controlling the operation of three hereinafter described relays located on each railway car provided with the apparatus comprising the present invention.

The control console 5 further comprises suitable radio transmitting apparatus for transmitting radio signals at a plurality of different frequencies, a different frequency for each push button, a total of thirty-nine. Moreover, the control console 5 also comprises suitable radio receiving apparatus denoted by the numeral 49 which includes an antenna 50 and suitable apparatus including a pressure gage 51 for indicating the combined pressure in the auxiliary and emergency reservoirs 46 and 47 on the railway car that at certain times is transmitting radio signals to this receiving apparatus in a manner hereinafter described.

The radio receiver 6 and radio transmitter 7 located on each railway car provided with the apparatus comprising the present invention may be, for example, the radio receiver and radio transmitter included in the so-called 580 Code System manufactured by the Signal & Communications Division of Westinghouse Air Brake Company, a subsidiary of American Standard, Inc. This 580 Code System is shown and described in Manual 580 published by the Signal & Communications Division of Westinghouse Air Brake Company, and reference may be had thereto for a detailed description of this receiver and transmitter.

Each of the frequency responsive relays 8 to 17 inclusive is operative responsively to a different frequency transmitted thereto from the control tower 4 via the radio receiver 6. Since these relays 8 to 17 inclusive differ only in that they operate in response to a different frequency, a description of one will suffice for all.

Each of the relays 8 to 17 inclusive comprises a pick-up coil 52 tuned to the pick-up frequencies, a holding coil 53 and two normally open contacts indicated in the drawing by the reference numerals 54 and 55. The pick-up coil 52 of each relay is connected between an output signal wire 58 of radio receiver 6 and ground. The contacts 54 of relays 8 to 17 are serially connected in a power supply circuit including a source of electrical power, such as a storage battery 56, the negative terminal of which is connected to ground. Each contact 55 is connected in a self-holding or "stick" circuit including the corresponding holding coil 53 which is connected to ground. In order to insure proper sequence of pick-up of relays 8 to 17, these relays are so interlocked as to prevent energization of the self-holding coil 53 until the immediately preceding relay in the numerical series is picked-up. For example, contact 54 of relay 8 must be in closed position in order for closure of contact 55 of relay 9 to establish the energizing circuit for the holding coil of relay 9. Thus, unless the appropriate car number is transmitted from the control tower corresponding to the car to be controlled, relays 8 to 17 will not remain picked-up, to provide a closed circuit to a binding post 57. Also connected between the radio receiver output wire 58 and ground is a pick-up coil 59 of a double coil frequency-responsive lock relay 60, the pick-up frequency of which is different than that of the pick-up frequencies of relays 8 to 17 inclusive. The pick-up frequency for coil 59 is that of the signal broadcast from the control tower 4 when the operator depresses the push button U of the control console 5.

A single coil double-contact proximity switch 61 and a single contact fluid pressure operated switch 62 are connected in series relation in a power supply circuit between the battery 56 and the radio receiver 6 and also between this battery and the relay 8.

The proximity switch 61 comprises two normally open contacts 63 and 64 and a holding coil 65 connected in a self-holding or "stick" circuit including the contact 63 to the battery 56 when these contacts are moved to a closed position by actuation of an armature 66 of magnetic material in passing over a permanent magnet 67 located alongside the incoming track to a railway classification yard.

The fluid pressure operated switch 62 comprises a single contact 68 connected by a stem 69 to a movable abutment 70 subject to brake pipe pressure in a chamber 71 supplied thereto from the brake pipe 45 via a branch pipe 72 to maintain the contact 68 open so long as pressure in the brake pipe 45 is sufficient to overcome the force of a spring 73 which is effective to close the contact 68 in the absence of fluid under pressure in the chamber 71.

While the respective contacts 54 of all of the relays 8 to 17 inclusive are in closed position, a power supply circuit is established from the battery 56 to the binding post 57 via proximity switch 61 and pressure switch 62, assuming that switches 61 and 62 have been operated to closed position.

The hereinbefore-mentioned lock relay 60 comprises, in addition to its pick-up coil 59 tuned to the proper signal frequency to pick-up upon an operator depressing the push button U of the control console 5, a holding coil 74 and two normally open contacts 75 and 76. The contact 76 is connected in a self-holding or "stick" circuit including the holding coil 74 which is connected to ground whereby the relay 60 remains picked-up subsequent to the operator releasing the push button U of the control console 5.

The contact 75, when picked up, establishes a power supply circuit from a wire 77 connected to the binding post 57 to a wire 78 which is connected to one end of an actuating coil 79 of a solenoid operated spring-returned spool valve device 80 of any suitable commercially available type, the other end of coil 79 being connected to ground. Upon energization of the solenoid actuating coil 79 in a manner hereinafter described, the valve device 80 is moved against the yielding resistance of a spring 81 to the position denoted in the drawing by the numeral 82 in which a pipe 83 connected to a chamber 84 formed in the release and resupply valve device 1 is connected through the valve device 80 to atmosphere via an exhaust pipe 85. Upon deenergization of the solenoid 79, the valve device 80 is returned by the spring 81 to the position denoted in the drawing by the numeral 86 in which a communication is established between the pipe 83 and a pipe 87 that is connected to the emergency reservoir 47. A branch pipe 87a has one end connected to the pipe 87 and the opposite end connected to the emergency reservoir port of the brake control valve device 2 in order that the emergency reservoir 47 may be charged with fluid under pressure from the brake pipe 45 upon increasing the pressure in the brake pipe to effect a brake release subsequent to effecting an emergency brake application.

To render the radio transmitter 7 effective to transmit a feedback radio signal to the radio receiving apparatus 49 located at the control tower 4, subsequent to closing of the contact 64 of proximity switch 61, contact 68 of pressure switch 62, and contact 54 of the relays 8 to 17 inclusive, a wire 88 connects the binding post 57 to this transmitter 7.

For controlling the actuation of the release and resupply valve device 1, the remotely controlled railway brake apparatus constituting the present invention further comprises a double solenoid operated double-spring returned spool valve device 89 of any commercially available type, a single coil single contact frequency responsive release relay 90 for controlling the power supply circuit to a first solenoid-actuating coil 91 of valve device 89, and a single coil single contact frequency responsive lap relay 92 for controlling the power supply circuit to a second solenoid-actuating coil 93 of the valve device 89. It should be understood that the frequencies at which the relays 90 and 92 are operated to their picked up position differ one from the other and are different than that of the relays 8 to 17 inclusive, and also that of the lock relay 60. The frequencies of these relays 90 and 92 are such as to be responsive to the signal broadcast from the control tower 4 upon an operator depressing respectively the push buttons R and L of the control console 5.

The release relay 90 comprises a pick-up coil 94 one end of which is connected by a wire 95 to the wire 58 and the opposite end of which is connected to ground. Relay 90 further comprises a single contact 96 which, in its picked up or closed position, connects the first solenoid-actuating coil 91 to the binding post 57 of spool valve device 89. The other end of this coil 91 is connected to ground. Upon energization of the solenoid actuating coil 91 in a manner hereinafter described, the valve device 89 is moved against the yielding resistance of a spring 97 to the position denoted in the drawing by the numeral 98 in which one end of a pipe 99 connected to the brake cylinder pipe 48 is connected through the valve device 89 to a pipe 100 that opens into the right-hand end of the bore 23 in the release and reapplication valve device 1.

The lap relay 92 comprises a pick-up coil 101 one end of which is connected by a wire 102 to the wire 58 and the opposite end of which is connected to ground. Relay 92 further comprises a single contact 103 which, in its picked up or closed position, connects one terminal of the second solenoid actuating coil 93 of spool valve device 89 to the binding post 57, the other terminal being connected to ground. Upon energization of the solenoid actuating coil 93 in a manner hereinafter described, the valve device 89 is moved against the yielding resistance of a spring 104 to the position denoted in the drawing by the numeral 105 in which one end of the pipe 99 is connected through the valve device 89 to a pipe 106 that opens into a chamber 107 formed in the end cover 21 at the right-hand face of the piston 27.

In order that the pressure gage 51 may indicate to the operator of the console 5 at the control tower 4 the pressure of fluid in the pipe 99, to which both the auxiliary reservoir 46 and emergency reservoir 47 are connected while the brake control valve device 2 is in its emergency position, or that the computer located at the control tower 4, if a computer is used instead of the control console 5, may be provided with intelligence concerning the pressure of fluid in these reservoirs, the remotely controlled railway car brake apparatus embodying the invention also comprises a pressure sensitive crystal or transducer 108 which is connected to the pipe 99 by a pipe 109. This pressure sensitive crystal 108 may be, for example, a piezoelectric crystal of any well-known commercial type.

The pressure sensitive crystal 108 is connected to the radio transmitter 7 by a pair of wires 110 and 111 in order that this transmitter 7 may transmit a specific radio signal via an antenna 112 to the radio receiving apparatus 49 of the control console 5 to cause the presure gage 51 to indicate to the operator of the console 5 the pressure present in the pipe 99 or, in other words, the equalized pressure between the auxiliary reservoir 46 and the emergency reservoir 47 while the brake control valve device 2 is in its emergency position. So long as the pressure gage 51 shows that the equalized pressure is above a chosen value, the operator is apprised of the fact that fluid at a sufficiently high pressure to effect a brake application on the car is present in the reservoirs 46 and 47.

OPERATION

As a train travels along the incoming track to a classification yard of a railway terminal, the armature 66 of the proximity switch device 61 on each car in the train provided with the remotely controlled railway car brake apparatus embodying the invention passes over the wayside permanent magnet 67 located alongside of this incoming track and is attracted downward toward this magnet. As each armature 66 is thus moved downward, the corresponding contacts 63 and 64 are likewise moved downward to a closed position in which these contacts are closed. Upon the contact 63 thus being moved to its closed position, a self-holding circuit is established to maintain these contacts in their closed position. Consequently, the coil 65 is effective to maintain these contacts 63 and 64 closed subsequent to the armature 66 passing over and away from the wayside permanent magnet 67.

Upon the train approaching the location on the incoming track at which the engineer desires to stop it, he will effect a service brake application on the entire train by moving the handle of the brake valve on the lead locomotive to its service position.

When the train has stopped moving, a trainman will first close the brake pipe angle cocks between the locomotive and the first car in the train and then disconnect the corresponding hose couplings.

Next, the couplers between the locomotive and the first car are uncoupled after which the locomotive is moved away from the train to any suitable place such as, for example, a round house. The train of cars is now ready for humping and classification in the classification yard of the terminal.

Now a pusher or switcher locomotive is coupled to the back end of the train after which the hose couplings on this locomotive and the adjacent first car are coupled and the corresponding angle cocks opened. Assuming that the handle of the brake valve on the switcher locomotive is now placed in its release position, a brake release on all the cars in the train will be effected in the usual well-known manner.

Subsequent to effecting this brake release, the switcher locomotive will push the train of cars toward the top of the hump of the classification yard. When the car at the end opposite the switcher locomotive reaches the top of the hump, the propulsion power to the switcher locomotive is cut off and an independent brake application on the locomotive effected to keep the train from rolling backward.

Following thus stopping the train, the angle cock on the car adjacent the end car at the top of the hump is closed, after which the brake pipe hose couplings at the adjacent ends of these two cars are uncoupled thereby effecting an emergency brake application on the end car. The couplers on these two adjacent cars are now uncoupled.

Prior to the train reaching the terminal, the operator at the control tower 4 has been furnished via the railroad's audio communication system a consist of the train which gives the car owner and the car identification number of each car in the train.

Since the release of the emergency brake application on each car provided with the apparatus constituting the present invention is effected in the same manner, a description of the release of the emergency brake application for one car will suffice for all cars provided with the apparatus constituting the present invention. Accordingly, let it be supposed that the now uncoupled car at the top of the hump on which an emergency brake application has been effected is, for example, owned by the Atchison, Topeka and Santa Fe (A.T.&S.F.) Railroad Company and has the car identification number of, for example 968,371. Let it be further supposed that a trainman at the top of the hump now informs the operator at the control tower 4 by means of a walkie-talkie radio system, which forms no part of the present invention, that this first car has been uncoupled from the adjacent car, and therefore, is ready for the operator at the control tower 4 to effect a release of the emergency brake application on this car in order that it may roll free down from the top of the hump and thence via the appropriate switch or switches onto the desired classification track.

It will be understood that the frequencies of the relays 8, 9, 10 and 11 correspond to the car identification letters A, T, S, and F respectively, or, in other words, the frequencies of the relays 8, 9, 10 and 11 are such that these relays will be successively picked up in response to the operator at the control tower 4 successively depressing the push buttons A, T, S, and F of the console 5. It will be further understood that the frequencies of the relays 12, 13, 14, 15, 16 and 17 correspond to the car identification numbers 9, 6, 8, 3, 7 and 1 respectively or in other words the frequencies of these six relays are such that these relays will be successively picked up in response to the operator at the control tower 4 successively depressing the push buttons 9, 6, 8, 3, 7 and 1 of the control console 5.

Accordingly, for the operator at the control tower 4 to effect a release of the emergency brake application on the car owned by the Atchison, Topeka and Santa Fe Railroad Company and having the car identification number of 968,371, he will first depress the push button A of the control console 5.

Upon the operator thus depressing the push button A of the control console 5, a radio signal, at the frequency at which the relay 8 is responsive to, is transmitted by the radio transmitting apparatus of console 5 to the radio receiver 6 on the car via an antenna 113 to which receiver 6 electric current is now being supplied from the positive terminal of the battery 56 via contact 64 of proximity switch 61 and contact 68 of pressure switch 62, it being understood that this receiver 6 is connected to ground to thereby complete the circuit to the negative terminal of the battery 56.

The radio receiver 6 is operative responsively to the radio signal transmitted thereto upon the operator at the control tower 4 depressing the push button A of the console 5, to effect the supply of current from the battery 56 to the radio receiver output wire 58 and thence to the pick-up coil 52 of the relay 8. This supply of electric current to the pick-up coil 52 of relay 8 effects pick up or closing of the contacts 54 and 55 of this relay 8. The contact 54, as it moves to its closed position, connects the battery 56 to a wire 114. Likewise, the contact 55 establishes a self-holding circuit for the holding coil 53.

Subsequent to the operator depressing the push button A of the control console 5, he will successively depress the push buttons T, S and F whereupon the respective relays 9, 10 and 11 will be correspondingly successively picked up and stuck up in the same manner as hereinbefore described for the relay 8.

Next, the operator will successively depress the push buttons 9, 6, 8, 3, 7 and 1 of the control console 5, it being understood that these buttons correspond to the car identification number of 968,371, and, upon being thus successively depressed, cause the relays 12 to 17 inclusive to be successively picked up in the same manner as hereinbefore described for the relay 8. It will be understood that the positive terminal of the battery 56 is now connected to the binding post 57.

The operator at the control tower 4 will now depress the push button U of the console 5 whereupon the lock relay 60 will be picked up and stuck up in the manner hereinbefore described. The contact 75 of relay 60, when in its closed position, connects the wire 77 to the wire 78 which is connected to actuating coil 79 of valve device 80. Consequently, upon closing of contact 75 of relay 60, a circuit is established for effecting energization of coil 79 whereupon the valve device 80 is moved against the yielding resistance of spring 81 to the position denoted by the numeral 82. In this position of valve device 80 communication between pipes 87 and 83 is closed and a communication is established between pipe 83 and exhaust pipe 85 whereupon fluid under pressure present in the chamber 84 in release and resupply valve device 1 is completely vented to atmosphere.

After the relay 60 has been operated in the manner just described to effect the release of fluid under pressure from the chamber 84 in valve device 1, the operator will depress the push button R of console 5 and hold it depressed whereupon the release relay 90 will be picked up in the manner herein before described to effect closing of its contact 96. This contact 96, when closed, connects the positive terminal of the battery 56 to one end of a wire 115 via the binding post 57. The other end of the wire 115 is connected to actuating coil 91. Therefore, current will now flow from the positive terminal of battery 56 to effect energization of solenoid actuating coil 91.

Upon energization of coil 91, the valve device 89 is moved against the yielding resistance of spring 97 to the position denoted by the numeral 98 in which the pipe 99 is connected to the pipe 100. It being remembered that the brake control valve device 2 is now in its emergency position, it will be understood that the auxiliary reservoir 46 and emergency reservoir 47 are connected to the pipes 48 and 99 so that the equalized pressure of these now connected reservoirs is present therein. Consequently, fluid under pressure will now flow from the pipe 99 to the right-hand end of the spool type valve 22 via pipe 100. Since no fluid under pressure is present in chamber 84 at this time, the fluid under pressure thus supplied to the right-hand end of valve 22 is effective to move this valve in the direction of the left hand against the yielding resistance of spring 29 until the left-hand end of valve 22 abuts stop 39.

As hereinbefore stated, the length of the groove 32 is such that, while the valve 22 occupies the position in which its left-hand end abuts stop 39, a communication is established between pipes 35 and 37. Consequently, fluid under pressure will now be released from the brake cylinder 3 to atmosphere via the check valve device 38 until the pressure in the brake cylinder 3 is reduced to a value corresponding to the strength of the spring 40 which, for example, may be such as to retain a pressure of nine pounds per square inch in brake cylinder 3 which pressure is merely sufficient to maintain the brake shoes in contact with the tread surfaces of their corresponding wheels without exerting any appreciable braking force thereon.

When the emergency brake application on this car at the top of the hump has been released in the manner just described, it will roll free downward from the top of the hump and onto the desired classification track which is at a slight downgrade. Therefore, this car will accelerate or increase its speed as it travels along this track.

It will be assumed that the operator at the control tower 4 can see this car as it travels along the classification track. Accordingly, when the speed of this car exceeds a speed which, in the judgment of the operator, is a safe speed, he will effect a reapplication of the brakes on this car by releasing the depressed button R of the control console 5.

When the button R is thus released, the radio transmitting apparatus of the console 5 will cease to transmit a radio signal the frequency of which is that required to maintain the release relay 90 picked up. Consequently, contact 96 of relay 90 will open thus disconnecting the battery 56 from wire 115 and thereby interrupting the power supply circuit to coil 91 of valve device 89.

Upon interruption of the power supply circuit to coil 91, spring 97 will move the valve device 89 from the position denoted in the drawing by the reference numeral 98 to the position denoted by the numeral 116 in which communication between pipes 99 and 100 is closed and pipe 100 is connected to atmosphere via an exhaust pipe 117. When pipe 100 is thus connected to pipe 117, fluid under pressure previously supplied to the right-hand end of valve 22 will be completely vented to atmosphere whereupon spring 29 will move valve 22 in the direction of the right hand to the position in which it is shown in the drawing.

Upon return of the valve 22 to the position shown, a communication is established between the pipes 33 and 35 via groove 30. Since the brake control valve 2 is now in its emergency position, it will be understood that the reservoirs 46 and 47 are connected to the pipe 48. Consequently, fluid under pressure will now flow from these reservoirs to the brake cylinder 3 to cause a reapplication of the brakes on the car, it being understood that the manually operated brake cylinder pressure release valve device 34 has not been operated so that pipe 48 is connected to pipe 33 via this valve device 34.

Fluid under pressure will flow from the reservoirs 46 and 47 to the brake cylinder 3 until equalization therebetween occurs unless valve 22 is moved to its lap position prior to the pressure in the brake cylinder 3 reaching equalization pressure.

Let it be assumed that the speed of the car is such that it is desired to limit brake cylinder pressure to a pressure that is less than equalization pressure. Therefore, upon the pressure in the brake cylinder 3 increasing to the desired value, the operator at the control tower 4 will effect movement of valve 22 of release and resupply valve device 1 from the position shown in the drawing to its lap position now to be described.

To effect movement of valve 22 to its lap position, the operator at the control tower 4 will depress the push button L of the console 5 and hold it depressed whereupon the lap relay 92 will be picked up, in the manner hereinbefore described, to effect closing of the contact 103. This contact 103, when closed connects the battery 56 to coil 93 of valve device 89. Current will now flow from the positive terminal of battery 56 to coil 93 thus effecting energization of this solenoid actuating coil.

This energization of coil 93 is effective to move the valve device 89 against the yielding resistance of spring 104 to the position denoted by the numeral 105 in which pipe 99 is connected to pipe 106. Fluid under pressure will now flow from the pipe 99 and reservoirs 46 and 47 to the chamber 107 via pipe 106. Fluid under pressure thus supplied to chamber 107 is effective on the right-hand face of piston 27 to move it and, via piston rod 28, the spool valve 22 in the direction of the left hand until the left-hand face of piston 27 abuts the left-hand end of counterbore 26. In this position of valve 22, the groove 30 no longer establishes communication between pipes 33 and 35, nor does groove 32 establish communication between pipes 35 and 37. Consequently, flow of fluid under pressure from the reservoirs 46 and 47 to the brake cylinder 3 is cut off and the fluid under pressure previously supplied to the brake cylinder is trapped therein.

The operator at control tower 4 can effect a reapplication of the brakes by releasing the depressed button L whereupon (1) coil 93 is deenergized, (2) valve device 89 returns to the position denoted by the reference numeral 116 in which pipe 106 is connected to an exhaust pipe 118 to release fluid under pressure from chamber 107 to atmosphere, and (3) spring 29 returns valve 22 and piston 27 to the position shown in the drawing. In this position the communication between pipes 33 and 35 is reestablished, whereupon fluid under pressure flows from the reservoirs 46 and 47 to the brake cylinder 3 thus effecting a reapplication of the brakes on the car at a greater degree.

Accordingly, from the foregoing, it is apparent that the operator at the control tower 4 can effect a resupply of fluid under pressure to the brake cylinder 3 until the pressure therein is increased to equalization pressure in the reservoirs 46 and 47, or to any desired chosen pressure that is less than this equalization pressure, to thereby reduce the speed of the car traveling along the classification track to a safe speed.

Should the speed of the car as it travels along the classification track fall below the safe speed, the operator at the control tower 4 may effect a release of fluid under pressure from the brake cylinder 3 to atmosphere by again depressing the push button R of the console 5 whereupon the spool valve 22 will be moved in the manner previously explained to the position in which fluid under pressure is vented from the brake cylinder 3 to atmosphere in the manner hereinbefore described. The speed of the car may then continue at the attained level or possibly even increase.

From the foregoing, it is apparent that the operator at the control tower 4 can by selectively depressing and releasing the push buttons R and L of the console 5 effect corresponding movements of the valve 22 of release and reapplication valve device 1 to its release, reapplication and lap positions to respectively thereby release fluid under pressure from and to supply fluid under pressure to the brake cylinder 3, or to trap fluid under pressure in the brake cylinder and thus control the speed of the car until it reaches the end of the classification track remote from the hump or until the pressure in the reservoirs 46 and 47, as indicated to the operator by the gage 51, has fallen to such a low value that the speed of the car can no longer be reduced by the resupply of fluid under pressure from these reservoirs to the brake cylinder 3.

Upon this first car reaching the desired location at the above-mentioned end of the classification track, a trainman that may be stationed at this location will set the hand brakes on this first car to maintain it at this end of this classification track.

Should the pressure in the reservoirs 46 and 47 fall to the above-mentioned low value prior to this first car reaching the desired location at the end of the classification track, a trainman thereafter by use of the hand brakes can control the speed of this car until it reaches the desired location.

The switcher locomotive may now move the train of cars until the second car in the train reaches the top of the hump. Upon this second car reaching the top of the hump, the train will be again stopped, after which an emergency brake application on this second car is effected and subsequently released in the same manner as hereinbefore described for the first car. Furthermore, at this time this second car is uncoupled from the third car in the train.

Subsequent to uncoupling this second car from the third car and effecting the release of the emergency brake application on this second car, it will roll free downward from the top of the hump and onto a second classification track.

The speed of this second car as it travels along this second classification track can be controlled by the operator at the control tower 4 in the same manner as hereinbefore described for the first car.

Let it be supposed that it is desired that any car other than the first two cars in the train be routed to the first classification track. The speed of this car can be controlled in the manner hereinbefore described so that the speed of this moving car as it collides with the stationary first car does not exceed, for example, four miles per hour.

It should be noted that, when the couplers of these two cars couple, upon the moving car colliding with the stationary car, a coupler operated switch 119 on the moving car is opened. When switch 119 is opened the power supply circuit for the holding coil 65 of proximity switch 61 is likewise opened whereupon a spring 120 is effective to move contacts 63 and 64 to their open position shown in the drawing. This movement of contact 64 to its open position opens the power supply circuit to (1) the radio receiver 6, and (2) the holding coil 53 of relays 8 to 17 inclusive whereupon the contacts 54 and 55 of these relays return to their open position shown thus interrupting the power supply circuit to wire 77 via binding post 57. Consequently, the holding coil 74 of lock relay 60 is deenergized whereupon contacts 75 and 76 of this relay 60 return to their open position.

Opening of contact 75 interrupts the power supply circuit to coil 79 of valve device 80 whereupon spring 81 returns this valve device to the position denoted by numeral 86 to establish a communication between pipes 87 and 83. Fluid under pressure will now flow from emergency reservoir 47 to chamber 84 in release and reapplication valve device 1 to hold or lock it in the normal position.

It should be noted that upon the supply of fluid under pressure from emergency reservoir 47 to chamber 84, the spring 29 will always return spool valve 22 to the position shown even if fluid under pressure is trapped in the pipe 100 or pipe 106 and is respectively acting on the right-hand end of the spool valve 22 or the right-hand face of piston 27 since the area of this face and end is the same as the area of the left-hand end of valve 22, and this trapped pressure is the equalized pressure between the reservoirs 46 and 47 and therefore cannot exceed the emergency reservoir pressure supplied to chamber 84. Consequently, upon opening of coupler switch 119 or a power supply failure to the radio receiver 6 or to the lock relay 60 or to both, the spool valve 22 will be returned to the position shown thereby establishing communication between pipes 33 and 35 to insure the resupply of fluid under pressure to the brake cylinder 3 if the brake control valve device 2 is in a brake application position at the time of the power failure, or the supply of fluid under pressure to brake cylinder 3 upon movement of the brake control valve device 2 to a brake application position subsequent to the power failure.

The remaining cars in the train, one at a time, may be routed to the desired track in the classification yard in the manner hereinbefore described.

Having now described the invention, what we claim as new and desire to secure by Letters Patent is:

1. Remotely controlled railway car brake apparatus comprising the combination of:
    (a) a brake pipe normally charged to a certain chosen pressure,
    (b) reservoir means normally charged to the pressure in said brake pipe,
    (c) pressure responsive braking means for effecting a brake application, and
    (d) a fluid pressure responsive brake control valve device operatively controlled by variations of pressure in said brake pipe and responsive to the chosen pressure in the brake pipe to release fluid pressure from said braking means and operative upon a reduction from said chosen pressure in said brake pipe to effect the supply of fluid under pressure from said reservoir means to said braking means to cause a brake application, wherein the improvement comprises:
    (e) a fluid pressure operated release and reapplication valve means, interposed between said brake control valve device and said braking means, having a plurality of different positions in the first of which a communication is established between said brake control valve device and said braking means, in the second of which said communication is closed, and in the third of which a communication is established through which fluid under pressure is released from said braking means to atmosphere, and
    (f) means remotely controlled by radio transmitted signals for selectively controlling operation of said release and reapplication valve means.

2. Remotely controlled railway car brake apparatus, as claimed in claim 1, further characterized in that said means remotely controlled by radio transmitted signals comprises:
    (a) a radio receiver for receiving radio signals transmitted at a plurality of different frequencies,
    (b) a plurality of frequency-responsive relays having parallel-connected windings respectively operatively responsive to signals of a different frequency supplied thereto from said radio receiver, said relays being operable sequentially to their respective picked-up positions in response to a succession of transmitted signals of different frequency, said relays having series-connected contacts effective when all of said relays are picked up to provide a power supply connection,
    (c) a first electro-responsive valve means for controlling operation of said release and reapplication valve means, and
    (d) two additional frequency-responsive relays operatively responsive to different signals received by said radio receiver, respectively, one of which relays is operable in its picked-up position to communicate energy from said power supply connection to cause operation of said first electro-responsive valve means to effect the supply of fluid under pressure to said fluid pressure operated release and reapplication valve means to cause movement thereof from its said first position to its said second position, and the other of which relays is operable in its picked-up position to communicate energy from said power supply connection to cause operation of said first electro-responsive valve means to effect the supply of fluid under pressure to said fluid pressure operated release and reapplication valve means to cause movement thereof from its said first position to its said third position.

3. Remotely controlled railway car brake apparatus, as claimed in claim 2, further characterized by a second electro-responsive valve means having a first position in which fluid under pressure is supplied to said fluid pressure operated release and reapplication valve means for effecting movement thereof to its first position, and by a third frequency responsive relay operatively responsive to a signal received by the radio receiver of a frequency different from that to which the said other relays are responsive and operable in its picked-up position to communicate energy from said power supply connection to cause operation of said second electro-responsive valve means from its said first position to a second position in which fluid under pressure is released from said fluid pressure operated release and reapplication valve means thereby rendering said valve means movable from its first position to its second and third positions.

4. Remotely controlled railway car brake apparatus, as claimed in claim 2, further characterized by a source of electric power, and by a switch device effective in its closed position to establish a power supply circuit to said radio receiver, said switch device being operable to its closed position in response to energy transmitted to the car from the wayside, and means for maintaining said switch device closed upon cessation of transmission of said energy upon the wayside.

5. Remotely controlled railway car brake apparatus, as claimed in claim 2, further characterized by a source of electric power, and by a fluid pressure operated switch device effective in its closed position to establish a power supply circuit to said radio receiver, said switch device being operably controlled by the pressure in said brake pipe and being operative to its closed position in response to a predetermined reduction of the pressure in said brake pipe from said chosen pressure.

6. Remotely controlled railway car brake apparatus, as claimed in claim 2, further characterized by two series-connected switch devices effective in their closed position to establish a power supply circuit to said radio receiver, the first of said switch devices being operable to its closed position in response to energy transmitted to the car from the wayside, and comprising means for maintaining said switch device closed upon cessation of transmission of said energy from the wayside, and the second of said switch devices being operably controlled by the pressure in said brake pipe so as to move to its closed position in response to a predetermined reduction of the pressure in said brake pipe from said chosen pressure.

7. Remotely controlled railway car brake apparatus as claimed in claim 2, further characterized in that each of said plurality of frequency-responsive relays establishes a self-holding circuit for maintaining itself picked-up, said self-holding circuit including therein, except for the first of said relays in the series, a contact of a preceding relay in its picked-up position.

8. Remotely controlled railway car brake apparatus, as claimed in claim 3, further characterized in that said third frequency-responsive relay when picked-up establishes a self-holding circuit for maintaining itself picked-up independently of the radio transmitted signal, said self-holding circuit including said power supply connection.

9. Remotely controlled railway car brake apparatus, as claimed in claim 3, further characterized in that said first electro-responsive valve means effects the supply of fluid under pressure from said reservoir means to said fluid pressure operated release and reapplication valve means only while said brake control valve device is effective to supply fluid under pressure from said reservoir means to said braking means.

10. Remotely controlled railway car brake apparatus, as claimed in claim 3, further characterized in that said reservoir means comprises an auxiliary reservoir and an emergency reservoir, and in that said second electro-responsive valve means effects the supply of fluid under pressure from said emergency reservoir to said fluid pressure operated release and reapplication valve means independently of said brake control valve device.

11. Remotely controlled railway car brake apparatus, as claimed in claim 8, further characterized by a radio transmitter operable to transmit radio signals subject to establishment of said power supply connection and by means responsive to the pressure of fluid supplied to said braking means to cause said radio transmitter to operate to transmit a radio signal corresponding to said pressure.

References Cited
UNITED STATES PATENTS 3,385,964  5/1968  Clejan et al. _____ 246—182

DUANE A. REGER, Primary Examiner

U.S. Cl. X.R.

303—20